United States Patent [19]

Kehl et al.

[11] 4,118,891
[45] Oct. 10, 1978

[54] SYSTEM FOR GROWING PLANTS

[76] Inventors: Donald K. Kehl, 2915 Kings Dr.;
Eugene A. Crist, 2338 Pretty Bayou Island Dr., both of Panama City, Fla. 32401

[21] Appl. No.: 727,577

[22] Filed: Sep. 28, 1976

Related U.S. Application Data

[63] Continuation-in-part of Ser. No. 618,816, Oct. 2, 1975.

[51] Int. Cl.² ............................................. A01G 31/00
[52] U.S. Cl. ........................................ 47/59; 47/62
[58] Field of Search ..................... 47/4, 47, 58, 59–65, 47/87, DIG. 7, 45, 46; 61/3, 4, 5, 6, 8, 12, 18, 22 R, 22 A, 23, 26, 28, 29, 30, 34

[56] References Cited

U.S. PATENT DOCUMENTS

| Re. 14,081 | 3/1916 | Linxweiler | 61/12 |
|---|---|---|---|
| 66,210 | 7/1867 | Brown | 47/4 |
| 74,417 | 2/1868 | Perry | 47/58 |
| 941,894 | 11/1909 | Stetson | 47/46 |
| 948,620 | 2/1910 | Wait | 47/45 |
| 3,172,234 | 3/1965 | Eavis | 47/87 |
| 3,667,157 | 6/1972 | Longhini | 47/59 |
| 3,739,522 | 6/1973 | Greenbaum | 47/85 |
| 3,868,787 | 3/1975 | Wong | 47/63 |
| 3,872,621 | 3/1975 | Greenbaum | 47/87 |
| 3,877,172 | 4/1975 | Schwab et al. | 47/DIG. 7 |
| 3,931,695 | 1/1976 | Widmayer | 47/58 |
| 4,001,968 | 1/1977 | Green | 47/80 |

FOREIGN PATENT DOCUMENTS 28,527 9/1970 Japan ............................................. 47/63

OTHER PUBLICATIONS

Schippers, P. A. *Annotated Bibliography on Nutrient Film Technique,* V.C. Mimeo Lab., 1–1977, Department of Vegetable Crops, N.Y. State College of Agriculture, Cornell University, Ithaca, N.Y. 14853.

*Primary Examiner*—Edgar S. Burr
*Assistant Examiner*—James R. Feyrer
*Attorney, Agent, or Firm*—Peter L. Berger

[57] ABSTRACT

In a conduit system for feeding water and nutrients to plants, the conduits are formed of thin, pliable, collapsible plastic foil. The plant is placed in the tube through slots in the tube and the conduit is placed upon a sloped platform so that nutrient in water solution fed in at one end of the conduit can drain through the conduit and out the other end thereof. A stick member to partially dam the flow of the solution through the conduit is used at the location of a plant root system in the conduit to assure adequate feeding of the root system, especially before the root system is well developed. The stick may be provided with legs thereby to form a bridge with a plurality of such bridges arranged to bridge over the tube at locations so spaced along the tube as to support a horizontally disposed vine substantially out of contact with the tube.

12 Claims, 8 Drawing Figures

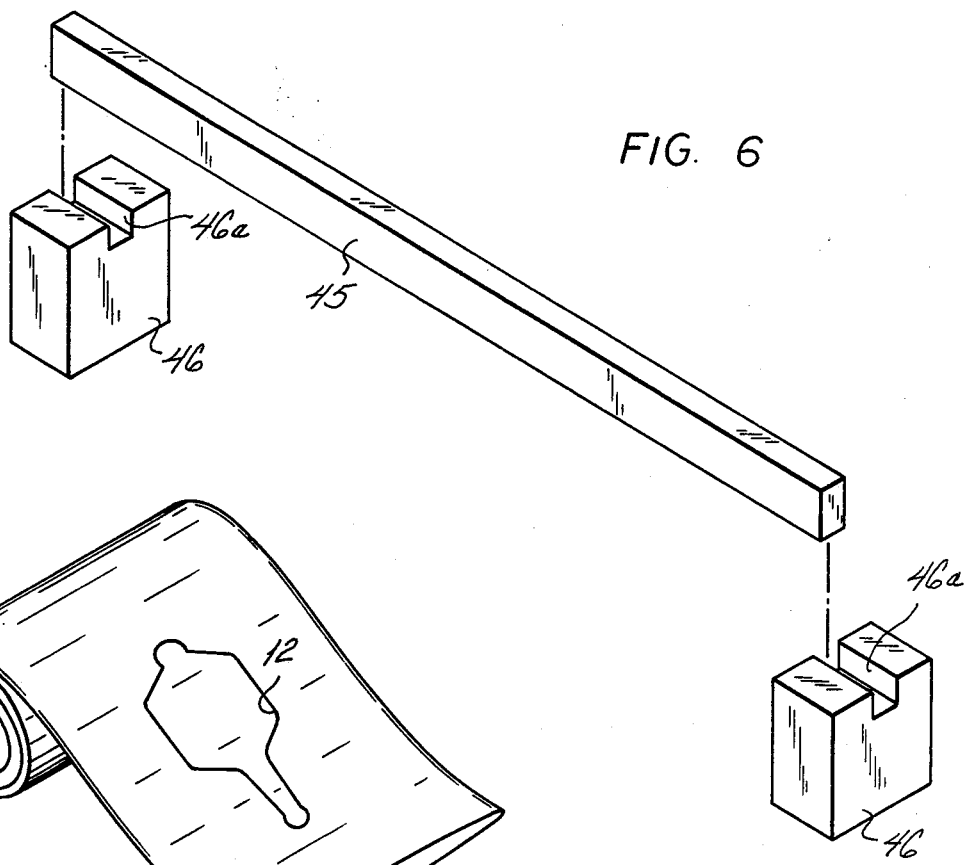
FIG. 6
FIG. 8
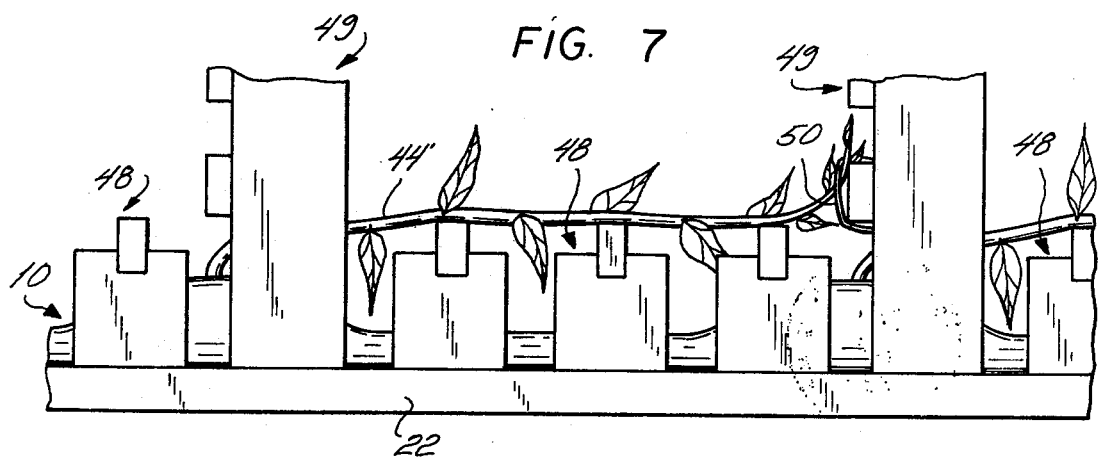
FIG. 7

SYSTEM FOR GROWING PLANTS

This application is a continuation in part of application Ser. No. 618,816 filed Oct. 2, 1975.

This invention relates to a system for growing plants, particularly in a soilless culture.

Soilless growth of plants, including vetetables and fruit bearing plants, generally is known as hydroponics. The individual plants are supplied with the proper amount of nutrients and water by a conduit system to enhance and promote plant growth under controlled conditions.

In recent years, small and medium sized greenhouses have been adapted for growing plants and vegetables commercially. Generally, the greenhouses include planting beds or platforms in which the plants and vegetables are nurtured and grow. The conduit systems for such greenhouses generally comprise a fixed aluminum trough-like member which is expensive, unwieldy and often ineffective for its intended purposes.

Further, because the conduits are used over and over again, accumulation of debris, root matter and other material clogging up the conduit system can become problematic.

Even if a disposable conduit is provided in accordance with the invention, as will hereinafter be described, whereby the problem of excessive accumulation of materials clogging the conduit is obviated, there still remains another problem. Namely, the aqueous nutrient solution flowing through the conduit may not attain a sufficient depth to adequately nourish the root systems of the plants, particularly when the plants are so young that their root systems are immature and small.

Another problem of practical importance is the growing of plants, particularly vines, is that the upper parts of the plant partially block sunlight from reaching the lower parts of the plant and the problem is not fully solved by periodic pruning or defoliation of the upper portions of the plant. Nevertheless, it has been conventional practice to trellis vines for substantially vertical growth, because permitting the vine to rest on the ground would promote rotting of the plant, particularly fruit borne on the vine, such as tomatoes, due to inadequate air circulation about the fruit and other parts of the vine.

An object of the present invention is to provide an improved system for growing plants, particularly hydroponically.

Another object of this invention is to provide an improved conduit system for hydroponics.

Another object of this invention is to provide such a conduit system which is disposable so that after the plant has completed its growth cycle, the conduit can be disposed of.

Another object of this invention is to provide such a conduit system which is inexpensive to manufacture, easy to use, light to carry, easy to store and efficient in operation.

Another object of this invention is to provide a hydroponic system in which inexpensive means are provided for assuring an adequate supply of the nutrient solution to the roots of the plants, even when the plants are so young that their root systems are immature and, consequently, small.

Another object of this invention is to provide a system for growing vines, especially a hydroponic system, in which a substantial portion of the vine is grown substantially horizontally.

Another object of this invention is to provide inexpensive means for supporting the substantially horizontal portion of the vine above the conduit and substantially out of contact with the conduit to promote the healthy growth of the vine, including fruit borne thereon.

Yet another object of this invention is to provide inxpensive means adapted for use either as the aforementioned means for assuring an adequate supply of the nutrient solution to the roots or as at least part of the aforementioned means for supporting the substantially horizontal portion of the vine.

Other objects, advantages and features of this invention will become more apparent from the following description.

In accordance with one aspect of this invention, there is provided a conduit system for supplying soilless plants with nutrients and water which comprises a thin, pliable plastic tubing supported upon a sloped platform and oriented lengthwise in the general direction of the slope. Spaced apart slots are provided in the plastic foil material through which the lower portion of the plants, primarily the roots, are placed into the conduit.

The more elevated end of the conduit is stapled closed with a distributor provided therein for supplying the aqueous nutrient solution to the conduit while the other, lower end is stapled closed and provided with holes to drain the excess of nutrient solution that remains after the nutrient solution has flowed through the conduit and has been partially taken up by the roots of the plants. The plastic is thin, generally of a thickness in the range of about 2–10 mils and especially polyethylene foil of such thickness has been used for the conduit of the system of this invention. As can be readily understood, the tubular material for the conduit of the system of this invention can readily be supplied in roll form and cut to desired length to be placed upon the platform or bed. Each end of the tubular material is then stapled closed on the platform or bed, holes being provided in the lower end of the tube for drainage, the other, more elevated end receiving the distributor means for carrying the nutrient solution to the conduit system. The ready storage, use and efficiency of the present invention is apparent, and it can be further understood that after the growth cycle is completed, this conduit can be discarded, thus eliminating problems discussed above.

It has been found advantageous that the tube be colored black or other color or in some other way be made opaque or translucent rather than transparent. Algae will tend to grow in the tube if substantial light impinges upon the inside of the tube. Moreover, black or other dark color will absorb radiant energy, which assists sufficient heating of the interior of the tube particularly during colder weather. On the other hand, strong summer sunlight, particularly in southern latitudes, can cause excessive heating of the interior of the tube, for example to a temperature of 110° F., which can deleteriously affect the nutrient solution. Under such conditions, it has been found to be beneficial to paint a reflective color on the tube, whereby, for example, the aforementioned temperature of 110° F. is reduced to 85° F.

According to another aspect of the invention, a respective stick or stick-like member is provided to partially dam the flow of the solution through the tube at the location of each plant root system in the tube to assure adequate feeding of the system, such stick or stick-like member being used especially when the plants are so young that their root systems are small and have not yet spread across the bottom of the tube. The aforementioned member may conveniently be referred to as a "dike stick." A respective dike stick is placed under the tube and extending across the breadth of the tube between each plant root system and the next adjacent plant root system in the tube. Because the plastic material of the tube is pliable, the bottom of the tube drapes over each dike stick. Thus, each dike stick forms a respective dam or dike in the tube. The height of the dike stick and, thus, of the dam formed in the tube is so selected relative to the flow of nutrient solution through the tube, that the nutrient solution spills over the dam while the dam maintains a pool of nutrient solution of sufficient depth around the root system that the plant is adequately nourished even though the root system is so young that it is small and has not spread across the bottom of the tube.

According to another aspect of the invention, vines, such as tomato plants, are grown substantially horizontally. The vine, which has roots which may be fed by the conduit system of the invention or other means, is initially trellised to grow vertically. When the vine has achieved a significant height, it is detached from the trellis and arranged horizontally and the growing end of the vine is trellised, and the foregoing sequence is repeated until the vine has attained the full desired growth. The resulting increased exposure of the vine to sunlight results in a dramatic increase in the yield of the vine. For example, according to the invention, a tomato plant was trellised on an 8 foot trellis to grow vertically out of the conduit system of the invention set up in a greenhouse. When the top of the plant reached the top of the trellis, the plant was detached from the trellis, laid on the substantially horizontal tube and only the growing end of the plant was trellised on an 8 foot trellis. This sequence was repeated with a number of tomato plants. The plants were thereby permitted to attain a substantially horizontal growth of about 40 to 50 feet in the greenhouse. Astounding yields of as much as 50 lbs. per plant were thus attained. Because the plants, including the maturing tomatoes, were in contact with the plastic tubing of the invention or support means which will hereinafter be described, rather than soil, rotting of the tomatoes did not occur.

According to another aspect of the invention, in the above described horizontal growing system, means were provided for supporting the horizontally growing vine substantially out of contact with the tube or at least to an extent that the vine or tomatoes growing thereon did not collapse any portion of the tube to a level below the level of the nutrient solution therein whereby the flow of the solution would be impeded or blocked. The support means may be in the form of a bridge the spanning member of which, supporting the vine, may be a stick or stick-like member which alternatively serves as a dike stick and the legs of which rest on the platform on either side of the tube and support the spanning member extending transversely over the tube at an appropriate elevation. These bridges are provided at sufficiently closely spaced locations along the length of the tube to provide adequate support. The legs are disengageable from the spanning member when the latter is to be used as a dike stick. Alternatively, the legs may be permanently attached to or integral with the spanning member and this structure may be oriented with the free ends of the legs oriented upwardly when the spanning member is to be used as a dike stick and inverted when the structure is to be used as a bridge. Functionally similar alternative arrangements can readily be envisioned and are intended to be encompassed within the scope of the present invention. For example, the platform on which the tubes of the hydroponic system are supported may be the bottoms of troughs, and members may be arranged at intervals bridging the troughs and thus serving as supports for the horizontally growing vines.

The invention will now be further described by reference to a specific embodiment as illustrated in the drawings, in which:

FIG. 6 is an exploded isometric view of an assembly of a dike stick as in FIG. 5 with leg members, the assembly constituting support means in the form of a bridge;

FIG. 7 is a side elevational view of a system for growing vines substantially horizontally, the system incorporating the bridges of FIG. 6 and trellises; and FIG. 8 is an isometric view of the tubular plastic material in roll form before it is cut into suitable lengths and arranged in the hydroponic system of the invention.

Figure 1:
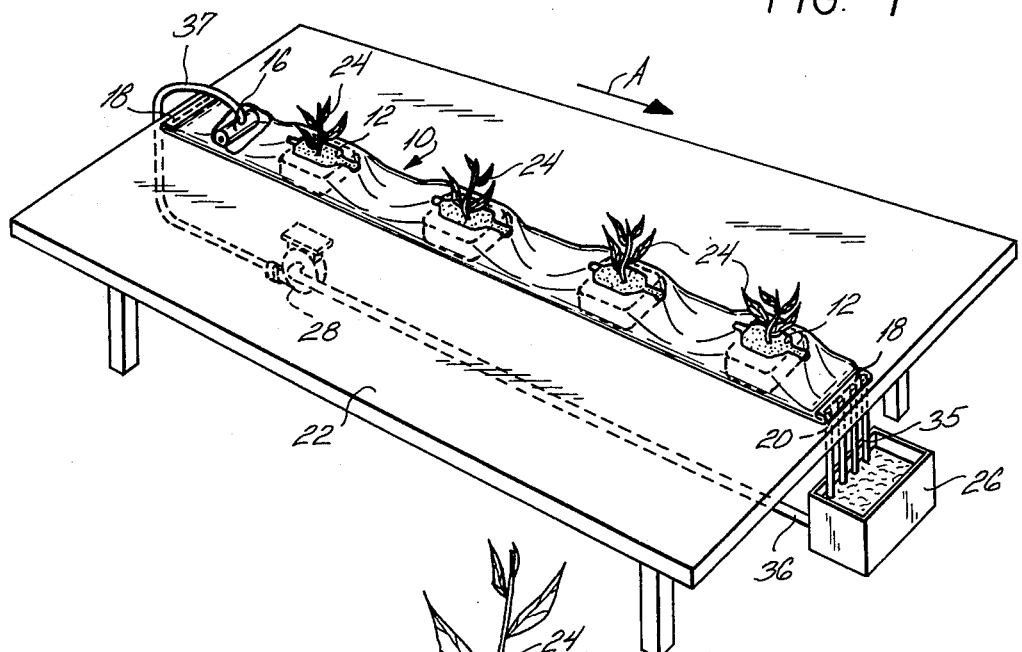
FIG. 1 is a perspective view of a platform upon which is carried the conduit system of this invention in which there are located and placed growing plants.
Figure 3:
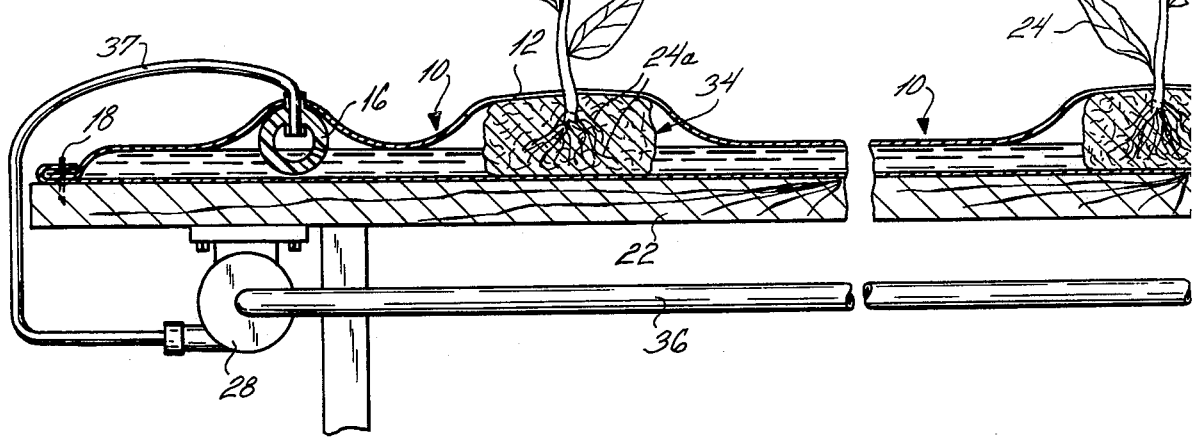
FIG. 3 is a side elevational view, partly in section, showing the conduit system with a return recirculating flow pump provided therewith.
Figure 2:
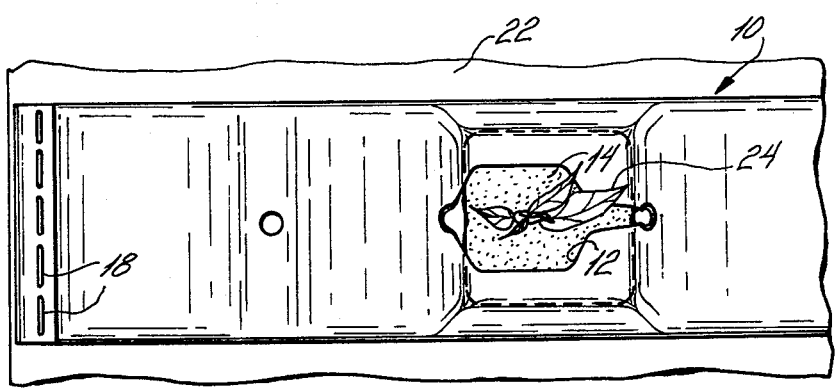
FIG. 2 is a plan view of the conduit system of this invention.

Referring to the drawings, particularly FIGS. 1 to 3, a plastic foil material is formed as a tube 10 in which there are spaced apart apertures or slots 12 generally extending lengthwise along the tube. The tube 10 can be supplied in the form of a roll R of collapsed tube from which the desired length of collapsed tube is readily unrolled and cut (FIG. 8). In the center area of the slots 12 there is provided an enlargement 14 so as to enable a plant to be placed therein. The tube 10 is arranged on a wooden platform 22 which is inclined slightly downwardly in the direction of arrow A, the tube 10 being oriented with its length parallel to the direction of the inclination of the platform 22. Each of the ends of the tube 12 is folded over onto itself and staples 18, dispensed by a staple gun, project through the folded over material and into the platform, sealing the ends of the tube 10 and fastening the tube 10 to the platform 22. At the more elevated end of the tube 10 there is provided a distributor 16, placed into the tube 10 before that end is sealed while at the other end of the tube 10 are provided holes 20 through the bottom portion of the wall of the tube 10 for allowing excess nutrients and water to drain from the conduit as the solution passes therethrough. In this regard, it can readily be understood that the staples alone do not effect the sealing, but rather such sealing is effected by the upward folding over of the tube material in combination with the stapling, and, consequently, the nutrient solution will flow past the staples to the holes 20. As the nutrient solution flows through the tube 10, it waters and nourishes the plants 24, the root systems 24a of each of which are embedded in a block or mass 34 of porous material, which is conventional for hydroponics and provides mechanical support for the plant as well as absorbs the solution with the aid of capillary action to bring the solution into contact with the root systems 24a.

Figure 4:
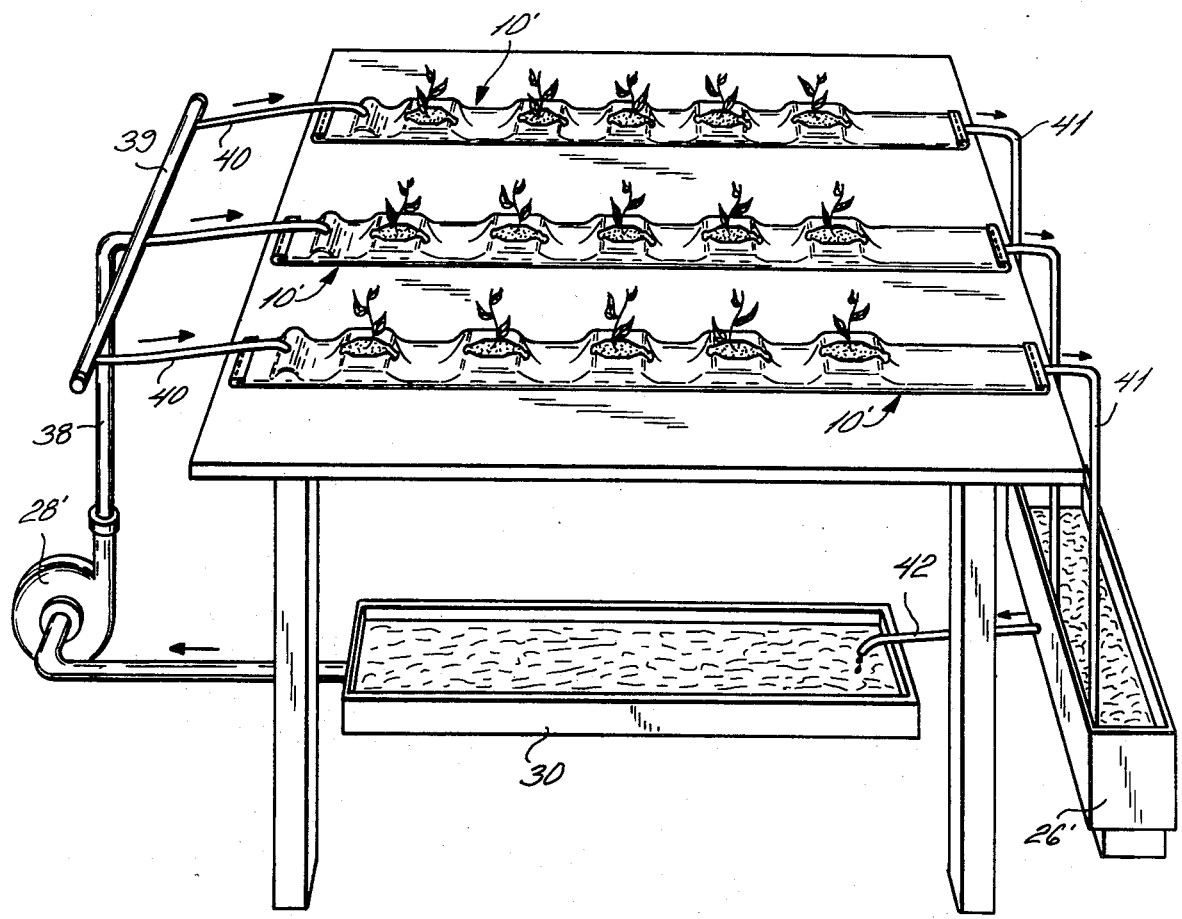
FIG. 4 is a perspective view of a plurality conduit systems operating with a central feed system.

The holes 20 communicate with a recirculating system comprising rigid tubes 35 communicating between the holes 20 and a reservoir 26, the reservoir 26 being connected through a pump 28 by means of pipes 36 and 37 to distributor 16. Make-up nutrients, water or nutrient solution can be added to the reservoir 26 as required. conduit systems Referring to FIG. 4, there is shown in operation a plurality of conduit systems 10' which generally can operate within a single enclosed greenhouse. Each of the collapsible, pliable plastic foil tubes or conduit systems 10' is mounted on a platform as discussed above with regard to FIGS. 1 to 3. In most greehouses, ground level troughs are provided and as another embodiment of this invention, all of the individual conduit systems 10' are joined together with the excess liquid collecting in and being recirculated from a central trough 30 which is connected to pump 28' and may be inclined toward the pump 28' to assist recirculation by the pump 28'. A pump 38 conducts the solution from the pump 28' to a header 39 from which the solution is fed to the conduits 10' through rigid tubes 40 which may communicate with distributors (not illustrated in FIG. 4) like that illustrated in FIG. 6. The solution flows through the conduit 10', nutrient and water from the solution is taken up by the root systems of the plants and the remaining solution passes through rigid tubes 41 to reservoir 26' and back to trough 30 through rigid tube 40.

Figure 5:
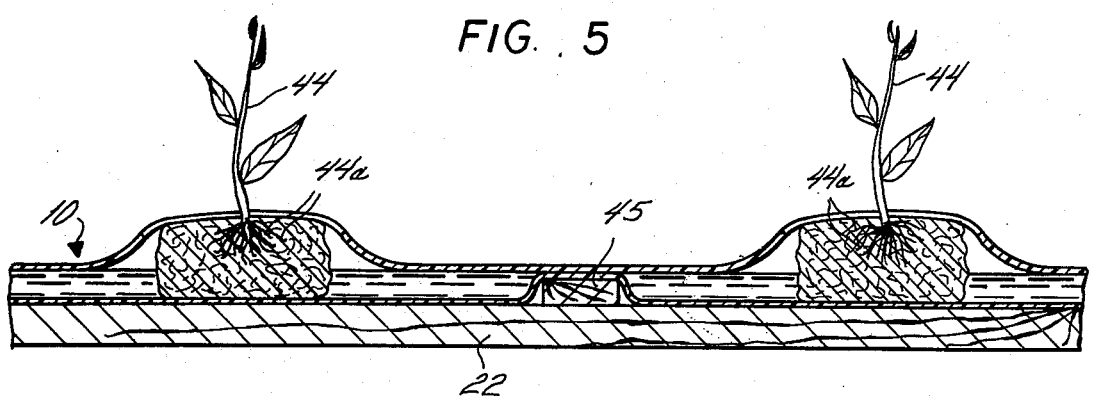
FIG. 5 is a fragmentary side elevational view, partly in section, of the conduit system of the invention in combination with dike sticks according to the invention.

In FIG. 5 is illustrated the use of dike sticks according to the invention. Here, young plants 44 have shallow root systems 44a and dike sticks 45 are inserted under the conduit 10, the pliant wall of which drapes over the dike sticks, whereby dams or dikes partly damming the flow of solution are formed between the plants 44, whereby pools of the solution of greater depth are formed about the blocks retaining the root systems 44a so that the plants are watered and fed with great efficiency despite the shallowness of the root systems 44a.

A dike stick 45 may be combined with leg members 46 (FIG. 6) to form bridges 48 for use in a horizontal growing system according to the invention as illustrated in FIG. 7. Each of the leg members 46 is a block of wood provided with a notch 46a in which the wooden dike stick 45 is received. Hence, the dike sticks 45 are first used in the manner illustrated in FIG. 5 and, then, are combined with leg members 46 and used in the manner illustrated in FIG. 7.

With more specific reference to FIG. 7, it is seen that a plurality of vertical trellises 49 have been erected on the platform 22 stradling the tube 10. The trellises are about eight feet high and are located at intervals of about 8 feet. A tomato plant 44 of FIG. 5 has become a vine 44' of substantial length as illustrated in FIG. 7. One of the trellises 49 is adjacent the vine 44'. The vine 44' was initially trained on that trellis. When the vine 44' reached the top of the first trellis, it was disengaged from that trellis and laid across the bridges 48 which kept it from bearing heavily on the tube 10. As seen in FIG. 7, the growing end of the vine 44' has now been tied to the second trellis by means of a conventional paper covered wire fastener 50 which is twisted to secure it in place. This sequence will be continued to subsequent bridges and trellises until the vine has achieved a full growth of perhaps about 40 feet. It will be readily understood that for simplicity of illustration only one vine has been shown in FIG. 7. Generally, the tube 10 will contain a plurality of tomato plants spaced along the tube, each of which will become a vine. Each vine will initially be trained upon the nearest trellis. To this end, the system may be provided with trellises at more frequent intervals than illustrated in FIG. 7. Vines can be laid alongside each other on the bridges 48 and can share trellises 49. Just as the configuration of the bridges is not critical, so, too, the configuration of the trellises is not critical. For example, the trellises may be in the form of arrays of vertical wires anchored to the ceiling and floor of the greenhouse adjacent the platform 22.

While the invention has been spcifically described by reference to particular, preferred embodiments, it is to be understood that such description is intended to illustrate rather than limit the invention as defined in the hereto appended claims.

What is claimed:

1. A conduit for use with a recirculating water-nutrient solution plant supply system of a type for growing a plurality of plants with respective roots of each plant supported in a respective plant medium located in a conduit, said conduit placed on a sloped surface so that gravity carries the water-nutrient solution to the plants in the conduit from one end to the other and a pump to recirculate the unused water-nutrient solution to the upper end of the conduit, the conduit comprising a continuous plant tube constituted of a thin, pliant plastic foil, the tube having the property of collapsing when empty, slotted openings formed in the top of the tube, said slotted openings being formed at intervals in said tube, each of said slotted openings being of a size sufficient to receive said plant medium, said tube portion forming said slotted openings being spread apart to open said slotted openings permitting said plant medium to be inserted in said tube, said tube comprising said upper end with means provided between said upper end and the first slotted opening for introduction of said solution and an open end through which the unused portion of the solution drains from said tube, the bottom portion of said tube being closed between said ends to comprise a continuous impervious channel unobstructed except by said plant medium for said water-nutrient solution to flow between said ends with all of said unused solution leaving said tube exiting at said open end, said plants being in fluid communication with each other, the tube generally conforming to the shape defined by said plant and plant medium by draping on said medium to form said channel.

2. The conduit of claim 1, wherein said plastic foil comprises polyethylene having a thickness of no greater than 10 mils.

3. The conduit of claim 1, wherein each of said slotted openings further comprises a thin, narrow opening extending lengthwise in said conduit and an enlarged open portion in the center region of said narrow opening to accommodate the insertion of said plant and plant roots.

4. In combination a conduit for use with a recirculating water-nutrient solution plant supply system of a type for growing a plurality of plants with respective roots of each plant supported in a respective plant medium located in a conduit and an elevated platform, said elevated platform being sloped to form a sloped surface, said conduit being placed on said sloped surface so that gravity carries the water-nutrient solution to the plants in the conduit from one end to the other, a pump to recirculate the unused water-nutrient solution to the upper end of the conduit, the conduit comprising a continuous plant tube constituted of a thin, pliant plastic foil, the tube having the property of collapsing when empty, slotted openings formed in the top of the tube, said slotted openings being formed at intervals in said tube, each of said slotted openings being of a size sufficient to receive said plant medium, said tube portion forming said slotted openings being spread apart to open said slotted openings permitting said plant medium to be inserted in said tube, said tube comprising said upper end with means provided between said upper end and the first slotted opening for introduction of said solution and an open end through which the unused portion of the solution drains from said tube, the bottom portion of said tube being closed between said ends to comprise a continuous impervious channel unobstructed except by said plant medium for said water-nutrient solution to flow between said ends with all of said unused solution leaving said tube exiting at said open end, said plants being in fluid communication with each other, the tube generally conforming to the shape defined by said plant and plant medium by draping on said medium to form said channel.

5. In combination, a conduit and a recirculating water-nutrient solution plant supply system of a type for growing a plurality of plants with respective roots of each plant supported in a respective plant medium located in said conduit, said conduit being placed on a sloped surface so that gravity carries the water-nutrient solution to the plants in the conduit from one end to the other, a pump to recirculate the unused water-nutrient solution to the upper end of the conduit, the conduit comprising a continuous plant tube constituted of a thin, pliant plastic foil, the tube having the property of collapsing when empty, slotted openings formed in the top of the tube, said slotted openings being formed at intervals in said tube, each of said slotted openings being of a size sufficient to receive said plant medium, said tube portion forming said slotted openings being spread apart to open said slotted openings permitting said plant medium to be inserted in said tube, said tube comprising said upper end with means provided between said upper end and the first slotted opening for introduction of said solution and an open end through which the unused portion of the solution drains from said tube, the bottom portion of said tube being closed between said ends to comprise a continuous impervious channel unobstructed except by said plant medium, for said water-nutrient solution to flow between said ends with all of said unused solution leaving said tube exiting at said open end, said plants being in fluid communication with each other, the tube generally conforming to the shape defined by said plant and plant medium by draping on said medium to form said channel, said means provided between said upper end and said first slotted opening comprising a feed distributor means connected for supplying said solution to said plant, drain means at said open end of said tube for removing the unused water-nutrient solution after it has passed through said tube, reservoir means connected to said drain means, and a pump connected between said reservoir and said feed distributor means for carrying the water-nutrient solution from said reservoir to said tube.

6. The conduit of claim 5, wherein said drain means comprises a plurality of holes.

7. A combination for use with a recirculating water-nutrient plant supply system of the type comprising a slope platform capable of using gravity to drain the water-nutrient solution from one end of the platform to another and a recirculating pump system to return the unused water-nutrient solution to the platform, the combination comprising a continuous tube placed on said platform so that the solution is carried through the tube, said continuous tube constituted of a thin, pliant plastic foil and containing the roots of a plurality of plants spaced along the tube, the tube having the property of collapsing when empty and at least one elongated member for placement on said platform and insertion under said tube between said plants, said elongated member being of such length as to extend across the breadth of said tube and being of such height when on said platform as to partially dam the flow of said solution thereby to increase the depth of said solution around said plant roots when inserted under said tube between said plants, said elongated member being removable from under said tube to remove said partial dam.

8. In combination, a conduit for use with a recirculating water-nutrient solution plant supply system of a type for growing a plurality of plants with respective roots of each plant supported in a respective plant medium located in said conduit, said conduit being placed on a sloped surface so that gravity carries the water-nutrient solution to the plants in the conduit from one end to the other and a pump to recirculate the unused water-nutrient solution to the upper end of the conduit, the combination comprising said conduit and at least one elongated member, said conduit comprising a continuous plant tube constituted of a thin, pliant plastic foil, the tube having the property of collapsing when empty, slotted openings formed in the top of the tube, said slotted openings being formed at intervals in said tube, each of said slotted openings being of a size sufficient to receive said plant medium, said tube portion forming said slotted openings being spread apart to open said slotted openings permitting said plant medium to be inserted in said tube, said tube comprising said upper end with means provided between said upper end and the first slotted opening for introduction of said solution and an open end through which the unused portion of the solution drains from said tube, the bottom portion of said tube being closed between said ends to comprise a continuous impervious channel unobstructed except by said plant medium for said water-nutrient solution to flow between said ends with all of said unused solution leaving said tube exiting at said open end, said plants being in fluid communication with each other, the tube generally conforming to the shape defined by said plant and plant medium by draping on said medium to form said channel, and said elongated member being under said tube between said plants, said elongated member being of such length as to extend across the breadth of said tube and being of such height as to partially dam the flow of said solution thereby to increase the depth of said solution around said plant roots when inserted under said tube between said plants, said elongated member being removable from under said tube to remove said partial dam.

9. The combination of claim 8 comprising a plurality of elongated members with each of such elongated members being placed under said tube between a respective pair of adjacent plants.

10. A combination for use with a recirculating water-nutrient plant supply system of the type comprising a conduit for growing tomato plants and located on a sloped platform capable of using gravity to drain the water-nutrient solution through the conduit from one end to the other and a recirculating pump system to return the unused water-nutrient solution to the conduit, the combination comprising said conduit for containing the roots of a plurality of tomato plants spaced along said conduit, and a plurality of horizontal support means for supporting said tomato plants in a substantially horizontally orientation, each of said support means comprising an elongated member being supported substantially above and across said conduit and being spaced to prevent said supported tomato plants from touching said conduit.

11. The combination of claim 10, wherein said elongated member is also adapted for alternative use by being inserted under said conduit on said surface between said plants, said member being of such height as to partially dam the flow of said solution thereby to increase the depth of said solution around said plant roots when placed on said surface and inserted under said conduit between said plants.

12. The combination of claim 11, further comprising substantially vertical trellises located periodically along the conduit for trellising a vine on the vertical trellises.

* * * * *

UNITED STATES PATENT AND TRADEMARK OFFICE
CERTIFICATE OF CORRECTION

PATENT NO. : 4,118,891
DATED : October 10, 1978
INVENTOR(S) : Donald K. Kehl and Eugene A. Crist It is certified that error appears in the above-identified patent and that said Letters Patent are hereby corrected as shown below:

Column 1, line 8, "vetetables" should read --vegetables--.

Column 1, line 18, "grow" should read --grown--.

Column 1, line 36, "is" should read --in--.

Column 2, line 10, "inxpensive" should read --inexpensive--

Column 5, line 11, delete "conduit systems".

Column 5, line 24, "A pump 38" should read --A pipe 38--.

Column 5, line 29, after "conduit" insert --systems--.

Column 6, line 16, "spcifically" should read --specifically--.

Column 8, line 3, "slope" should read --sloped--.

Signed and Sealed this

Third Day of April 1979

[SEAL]

Attest:

RUTH C. MASON
Attesting Officer

DONALD W. BANNER
Commissioner of Patents and Trademarks